United States Patent
Lee et al.

(10) Patent No.: US 7,778,282 B2
(45) Date of Patent: Aug. 17, 2010

(54) PROPAGATION OF CONFLICT KNOWLEDGE

(75) Inventors: Oliver Lee, Redmond, WA (US); Michael Scott Beckerman, Bellevue, WA (US); Michael Ray Clark, Redmond, WA (US); Moe Khosravy, Kirkland, WA (US); Lev Novik, Bellevue, WA (US); Jörg-Thomas Pfenning, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 790 days.

(21) Appl. No.: 11/640,658

(22) Filed: Dec. 18, 2006

(65) Prior Publication Data

US 2008/0144669 A1 Jun. 19, 2008

(51) Int. Cl.
*H04J 3/06* (2006.01)
(52) U.S. Cl. ...................... 370/503; 370/400
(58) Field of Classification Search ............... 370/503, 370/507, 509, 510, 512, 255, 400, 401; 707/610–614, 707/624–625, 203, 204; 709/248, 203
See application file for complete search history.

(56) References Cited

U.S. PATENT DOCUMENTS

| | | | | |
|---|---|---|---|---|
| 5,687,168 | A * | 11/1997 | Iwata | 370/255 |
| 5,787,262 | A | 7/1998 | Shakib et al. | |
| 6,614,762 | B1 * | 9/2003 | Illiadis et al. | 370/252 |
| 6,944,642 | B1 | 9/2005 | Hopmann et al. | |
| 6,983,293 | B2 | 1/2006 | Wang | |
| 7,027,463 | B2 | 4/2006 | Mathew et al. | |
| 2004/0015456 | A1 | 1/2004 | Holtz et al. | |
| 2004/0122870 | A1 | 6/2004 | Park et al. | |
| 2005/0044187 | A1 * | 2/2005 | Jhaveri et al. | 709/219 |
| 2005/0177617 | A1 | 8/2005 | Banginwar et al. | |
| 2005/0223117 | A1 * | 10/2005 | Terry et al. | 709/248 |
| 2005/0237941 | A1 | 10/2005 | Beers et al. | |
| 2005/0256907 | A1 * | 11/2005 | Novik et al. | 707/200 |
| 2005/0262310 | A1 | 11/2005 | Starbuck | |
| 2006/0059208 | A1 | 3/2006 | Chen et al. | |
| 2006/0095481 | A1 * | 5/2006 | Singh et al. | 707/204 |
| 2006/0106879 | A1 | 5/2006 | Zondervan et al. | |
| 2006/0224622 | A1 * | 10/2006 | Velega | 707/104.1 |
| 2007/0226277 | A1 * | 9/2007 | Holenstein et al. | 707/204 |
| 2008/0104206 | A1 * | 5/2008 | Novik et al. | 709/220 |
| 2008/0104277 | A1 * | 5/2008 | Tian | 709/248 |

(Continued)

OTHER PUBLICATIONS

Edwards, Keith W., "Flexible Conflict Detection and Management in Collaborative Applications", Date: Oct. 1997, http://www.cos.ufrj.br/~jano/CSCW2005/edwards_1997.pdf.

(Continued)

*Primary Examiner*—Chi H. Pham
*Assistant Examiner*—Kevin Mew
(74) *Attorney, Agent, or Firm*—Capitol City TechLaw; Richard C. Irving

(57) ABSTRACT

A sync community may include a group of synchronization endpoints. When two synchronization endpoints of the sync community synchronize with one another, a synchronization data conflict may be detected when the two synchronization endpoints make a change to a same particular data item and the two synchronization endpoints were unaware of the changes to the same particular data item made by the other respective synchronization endpoint at the time the changes were made. Resolution of the detected synchronization data conflict may be delayed and data indicative of the detected synchronization data conflict may be propagated to other synchronization endpoints during a synchronization operation.

20 Claims, 11 Drawing Sheets

U.S. PATENT DOCUMENTS

| | | | |
|---|---|---|---|
| 2008/0195759 A1* | 8/2008 | Novik et al. | 709/248 |
| 2008/0288659 A1* | 11/2008 | Hasha et al. | 709/250 |
| 2009/0083441 A1* | 3/2009 | Clark et al. | 709/248 |
| 2009/0193149 A1* | 7/2009 | Khosravy | 709/248 |

OTHER PUBLICATIONS

Saito et al., "Optimistic Replication", Date: 2005, pp. 1-44, vol. V; No. N, 3, http://www-sor.inria.ft/~shapiro/papers/Optimistic_Replication_Computing_Surveys_2005-03_cameraready.pdf.

Novik et at, "Peer-to-Peer Replication in WinFS", Date: 2006, ftp://ftp.research.microsoft.com/pub/tr/TR-2006-78.pdf.

Saito et al., "Replication: Optimistic Approaches", Date: Feb. 8, 2002, http://www.ida.his.se/ida/kurser/distributed_real-time_systems/kursmaterial/doc/ref_ Saito02.pdf.

PCT/US2007/077225, Written Opinion and International Search Report for PCT application corresponding to present application, mailed Feb. 25, 2008.

* cited by examiner

PROPAGATION OF CONFLICT KNOWLEDGE

RELATED APPLICATION

This application is related to U.S. patent application Ser. No. 10/631,591, filed in the U.S. Patent and Trademark Office on Jul. 31, 2003.

BACKGROUND

A synchronization endpoint may be implemented on a processing device and may represent various data stores or devices that may include, but are not limited to, computers, notebook computers, personal digital assistants, cellular telephones or other wireless devices, a folder on a storage device having one or more files, a group of memory locations in a memory, server computers, online services, any other device or container to which data may be electronically stored or from which data may be electronically retrieved, or any combination thereof. A sync community may be a group of synchronization endpoints, which may synchronize with one another. In a two-way multi-master synchronization topology, pairs of synchronization endpoints may synchronize data with one another in a manner in which a first synchronization endpoint of a pair of synchronization endpoints may request synchronization with a second synchronization endpoint of the pair of synchronization endpoints and the second synchronization endpoint may request synchronization with the first synchronization endpoint. In a two-way multi-master synchronization topology, concurrent or nearly concurrent modifications may be made to a particular data item at different endpoints, such that a conflict may occur when the endpoints attempt to synchronize.

Existing synchronization applications use a number of techniques for resolving conflicts. Some synchronization applications resolve conflicts by displaying a user interface (UI) at synchronization time and requiring a user to select a conflict resolution. The drawback to this approach is that users are forced to be present during the synchronization process so that they may respond to the UI or risk not completing the synchronization process. Other synchronization applications defer conflict resolution and permit a user to resolve the conflict resolution via a UI at a later time. In some situations, the deferred conflict resolution may never be resolved because the conflict may be detected on an endpoint that does not have facilities for resolving conflicts. Other synchronization applications may implement automatic conflict resolution policies. For example, a synchronization application may resolve a conflict by always choosing a revision with a later write time as a winner of the conflict. In such a synchronization application, the discarded revision may be saved for an undo operation, which, when performed, may cause the discarded revision to be declared the winner of the conflict and may revise the data accordingly. However, a disadvantage to such a synchronization application is that the undo operation acts as a new revision to an item instead of unwinding one or more actions performed on the item.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

In embodiments consistent with the subject matter of this disclosure, synchronization endpoints within a sync community may synchronize with one another such that the synchronization endpoints may include consistent up-to-date data. However, it is possible for two synchronization endpoints to change a same data item at a time when each respective synchronization endpoint is unaware of the change being made by the other respective synchronization endpoint. When such changes are made to the same data item, a synchronization data conflict may exist. Resolution of the synchronization data conflict may be delayed and knowledge of the synchronization data conflict may be propagated to other synchronization endpoints when synchronizing with the other synchronization endpoints.

DRAWINGS

In order to describe the manner in which the above-recited and other advantages and features can be obtained, a more particular description is described below and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

DETAILED DESCRIPTION

Embodiments are discussed in detail below. While specific implementations are discussed, it should be understood that this is done for illustration purposes only. A person skilled in the relevant art will recognize that other components and configurations may be used without parting from the spirit and scope of the subject matter of this disclosure.

Exemplary Operating Environment

Embodiments consistent with the subject matter of this disclosure relate to synchronization of data among synchronization endpoints of a sync community. A synchronization endpoint may be implemented on a processing device and may represent various data stores or devices that may include, but are not limited to, computers, notebook computers, personal digital assistants, cellular telephones or other wireless devices, a folder on a storage device having one or more files, a group of memory locations in a memory, server computers, online services, any other device or container to which data may be electronically stored or from which data may be electronically retrieved, or any combination thereof. In some embodiments, a device which implements a synchronization endpoint may include multiple synchronization endpoints. An example of a synchronization operation occurring between two synchronization endpoints may include, but not be limited to, synchronization of two processing devices, two folders on a storage device or on two different storage devices, or two groups of memory locations in a memory or in two different memories.

Figure 1:
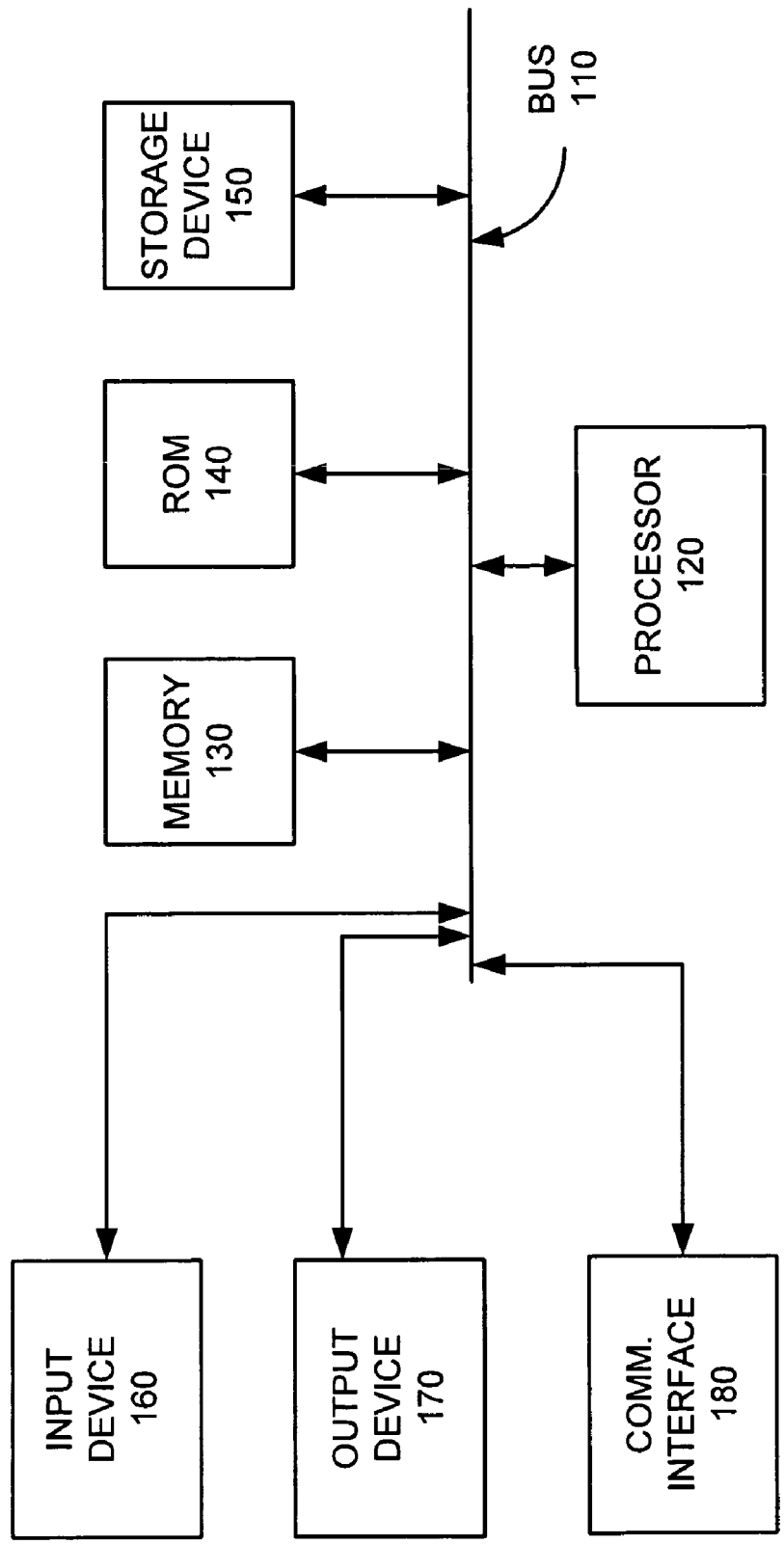
FIG. 1 is a functional block diagram of a processing device upon which a synchronization endpoint may be implemented.

FIG. 1 is functional block diagram of a processing device 100 which may be used to implement one or more synchronization endpoints in a sync community. Processing device 100 may include a bus 110, a processor 120, a memory 130, a read only memory (ROM) 140, a storage device 150, an input device 160, an output device 170, and a communication interface 180. Bus 110 may be a communication interface that permits communication among components of processing device 100.

Processor 120 may include at least one conventional processor or microprocessor that interprets and executes instructions. Memory 130 may be a random access memory (RAM) or another type of dynamic storage device that stores information and instructions for execution by processor 120. Memory 130 may also store temporary variables or other intermediate information used during execution of instructions by processor 120. ROM 140 may include a conventional ROM device or another type of static storage device that stores static information and instructions for processor 120. Storage device 150 may include any type of tangible media for storing data and/or instructions. In some embodiments, storage device 150 may include one or more folders, each of which may include one or more files.

Input device 160 may include one or more conventional mechanisms that permit a user to input information to processing device 100, such as, for example, a keyboard, a mouse, or other input device. Output device 170 may include one or more conventional mechanisms that output information to the user, including a display, a printer, or other output device. Communication interface 180 may include any transceiver-like mechanism that enables processing device 100 to communicate with other devices or networks.

Processing device 100 may perform such functions in response to processor 120 executing sequences of instructions contained in a machine-readable medium, such as, for example, memory 130, or other tangible medium. Such instructions may be read into memory 130 from another tangible machine-readable medium, such as storage device 150, or from a separate device via communication interface 180.

Figure 2:
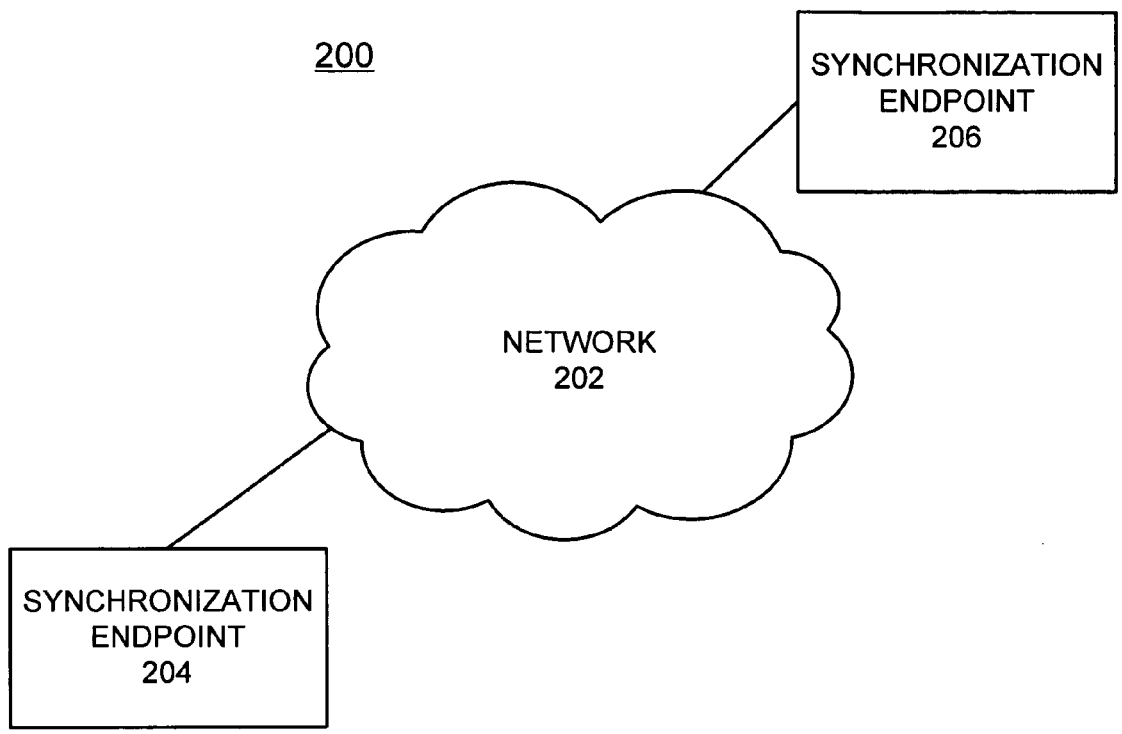
FIG. 2 illustrates an exemplary operating environment for a sync community of synchronization endpoints.

FIG. 2 illustrates an exemplary operating environment 200 for a sync community of synchronization endpoints. Exemplary operating environment 200 may include a network 202, synchronization endpoint 204 and synchronization endpoint 206.

Network 202 may be a wired or wireless network and may include a number of devices connected via wired or wireless means. Network 202 may include only one network or a number of different networks, some of which may be networks of different types.

Synchronization endpoint 204 and synchronization endpoint 206 may be implemented on two different processing devices, in this exemplary embodiment, such as, for example, processing device 100. In exemplary embodiment 200, synchronization endpoint 204 and synchronization endpoint 206 may communicate with one another via network 202.

Operating environment 200 is exemplary. Other embodiments consistent with the subject matter of this disclosure may be implemented in other operating environments. For example, network 202 may not be included in some operating environments, such as, for example, an operating environment in which the synchronization endpoints may be included in a single device.

Synchronization

In embodiments consistent with the subject matter of this disclosure, synchronization endpoints may synchronize with one another, such that the synchronization endpoints may include consistent up-to-date data. A conflict may occur during synchronization of the synchronization endpoints when one synchronization endpoint includes a change to a particular data item, another synchronization endpoint includes another change to the particular data item, and neither synchronization endpoint is aware of the change made to the particular data item by the other respective synchronization endpoint. For example, synchronization endpoint 1 may update John Smith's phone number in an address book database, and synchronization endpoint 2 may delete John Smith's phone number in the address book database. A conflict may occur when synchronization endpoint 1 and synchronization endpoint 2 synchronize with one another if both of the synchronization endpoints made the above-mentioned changes without knowledge of the changes made by the other respective synchronization endpoint. In various embodiments consistent with the subject matter of this disclosure, when a synchronization endpoint is unable to resolve a conflict, conflict resolution may be delayed and knowledge of the conflict may be propagated to other synchronization endpoints during synchronization operations.

Synchronization typically occurs among a group of participating synchronization endpoints that form a sync community. The total membership of the sync community may not be known to any given synchronization endpoint at any given time. Further, a topology of the sync community may not be known to any given synchronization endpoint at any given time. In one embodiment, each synchronization endpoint in the sync community may have an ID, such as, for example, a global unique identifier (GUID), or other ID which may be unique within the sync community.

Each synchronization endpoint may maintain "knowledge" that facilitates efficient and improved synchronization between synchronization endpoints. In one embodiment, knowledge may be metadata that expresses changes that are known to a given synchronization endpoint. Knowledge may be represented as a vector of change IDs, where each change ID may represent a synchronization endpoint ID and a maximum version (synchronization endpoint ID, max version). A number of change IDs in a particular knowledge vector may change as synchronization endpoints are added to or removed from the sync community. While the knowledge vector may also be expressed differently, it is advantageous to concisely represent the changes of which a particular synchronization endpoint is aware. The particular knowledge may or may not specifically contain a change ID for each synchronization endpoint in the sync community. Synchronization endpoints may be relieved from tracking what other synchronization endpoints already know, as this information is effectively represented by the knowledge of the synchronization endpoint.

The synchronization endpoints in the sync community may synchronize by providing their own knowledge to the synchronization endpoint with which they synchronize. To reduce an amount of data representing knowledge that may be sent between synchronizing synchronization endpoints, the knowledge may be expressed as a knowledge vector as previously described. Thus, the knowledge that is sent between the synchronization endpoints does not need to include every change ID, but may be in the form of a vector that represents a number of change IDs. For example, if a synchronization endpoint is aware of all changes made by a synchronization endpoint A from a first change to a tenth change, and all changes made by a synchronization endpoint labeled B from a first change to a fifth change, the synchronization endpoint might send a knowledge vector A10B5 indicating that the synchronization endpoint is aware of all changes corresponding to change IDs A1 to A10 and all changes corresponding to change IDs B1 to B5. While the knowledge may be expressed as a knowledge vector, other embodiments contemplate other expressions of knowledge as well. For example, some embodiments express knowledge using any expression of knowledge in which one can (1) add a change to the expression of knowledge, (2) check whether a change is included in the expression of knowledge, and (3) merge two expressions of knowledge together.

Figure 3:
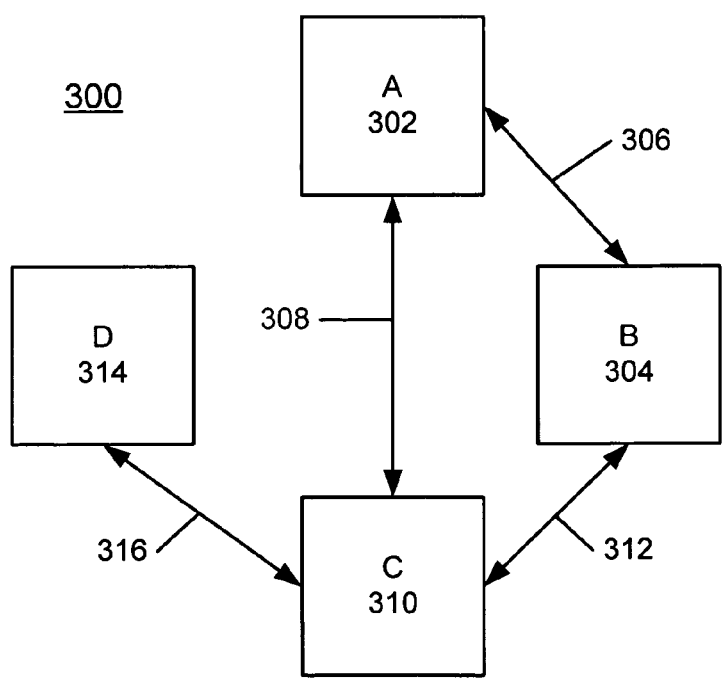
FIG. 3 illustrates an exemplary topology of a sync community.

FIG. 3 illustrates one example of a sync community 300 with an illustrated topology. Sync community 300 includes a number of synchronization endpoints and is one example of an environment for implementing embodiments consistent with the subject matter of this disclosure. Synchronization endpoints in the sync community 300 may be implemented on a device, such as, for example, processing device 100, and may represent various data stores or devices that may include, but are not limited to, computers, notebook computers, personal digital assistants, cellular telephones or other wireless devices, a folder on a storage device having one or more files, a group of memory locations in a memory, server computers, online services, any other device or container to which data may be electronically stored or from which data may be electronically retrieved, or any combination thereof.

FIG. 3 illustrates an exemplary sync community 300. In FIG. 3, a synchronization endpoint A 302 may be electronically coupled to a synchronization endpoint B 304 through a communication link 306. Synchronization endpoint A 302 may be connected through a communication link 308 to a synchronization endpoint C 310. Synchronization endpoint C 310 may be connected to synchronization endpoint B 304 through a communication link 312. Synchronization endpoint C 310 may further be connected to a synchronization endpoint D 314 through a communication link 316. In sync community 300, although not all of the synchronization endpoints are directly connected through communication links, changes in any of the synchronization endpoints can be synchronized to any of the other synchronization endpoints within sync community 300.

For example, for synchronization endpoint A 302 to be synchronized with the synchronization endpoint D 314, synchronization endpoints A 302 and C 310 may be synchronized through communication link 308. Thus, synchronization endpoint C 310 may include changes made on synchronization endpoint A 302. Synchronization endpoints C 310 and D 314 may then synchronize through communication link 316, and as such synchronization endpoint D 314 may include changes from synchronization endpoint A 302.

In this way, synchronization endpoint A 302 may synchronize with synchronization endpoint D 114 without any sort of direct link. In fact, synchronization endpoints A 302 and D 314 may not even be aware of each other's existence within the sync community 300. The illustrated communication links may be wired and or wireless links.

Figure 4:
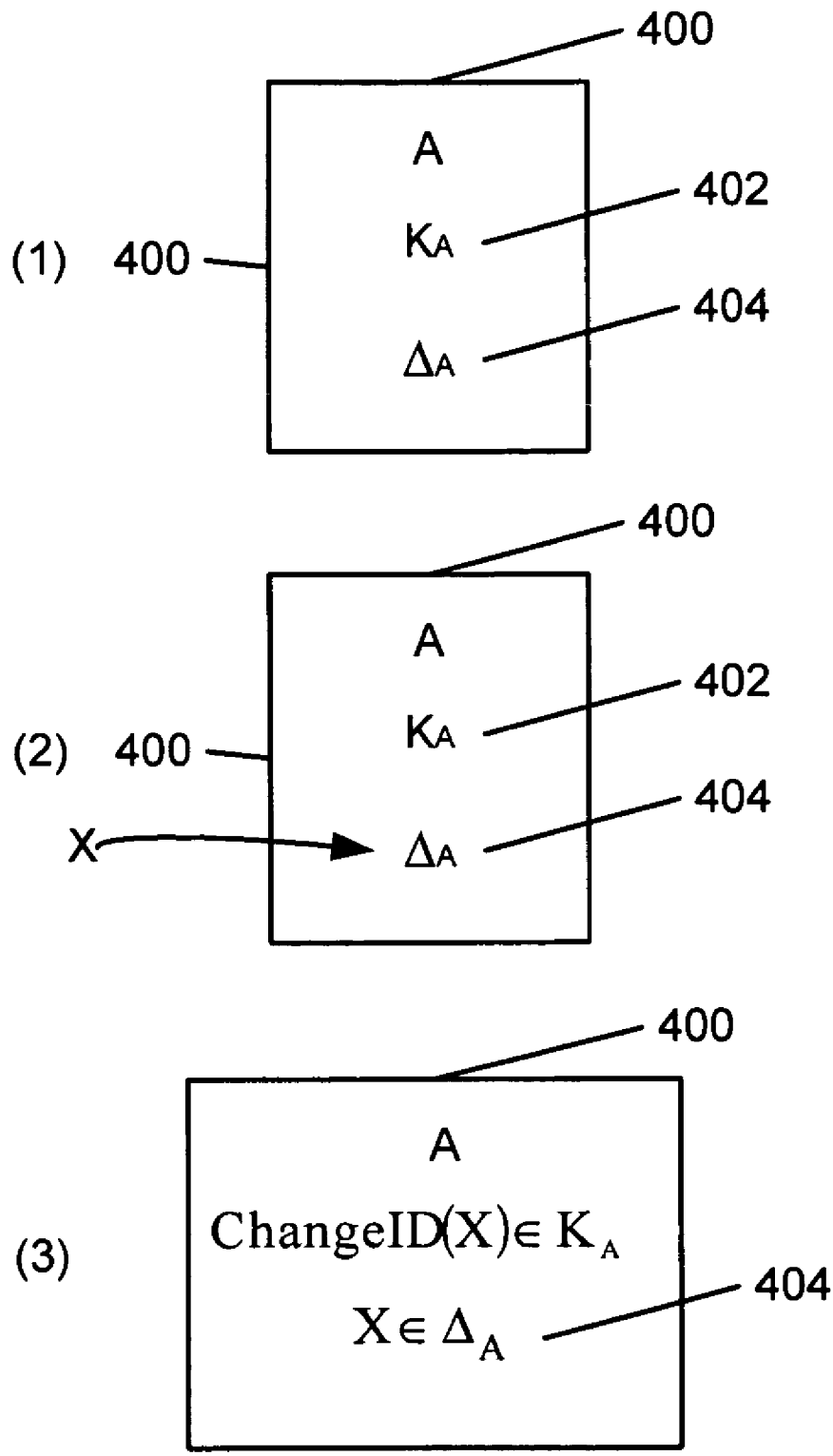
FIG. 4 is an exemplary timewise illustration of how changes may be managed in a synchronization endpoint in an embodiment consistent with the subject matter of this disclosure.

Referring now to FIG. 4, one embodiment consistent with the subject matter of this disclosure illustrates how changes may be managed in a synchronization endpoint. FIG. 4 shows a timewise progression of a synchronization endpoint A 400. Synchronization endpoint A 400 may include knowledge 402, in this case labeled $K_A$, and changes 404, in this case labeled $\Delta_A$. Each change in changes 404 may be current data content of an item. A change may be a new item added to a synchronization endpoint even though no item was changed per se, the deletion of an item, and the like. Each one of changes 404 may be associated with a version that, in one embodiment, may be a change ID. At time (1), synchronization endpoint A 400 is in a steady state. At time (2), a user inputs a change labeled X into synchronization endpoint A 400. FIG. 4 shows the change X being added as a member of the changes 404. At time (3), knowledge 402 may be updated to include a change ID, ChangeID(X), which is associated with the change X and may identify the addition of the change X to changes 404. This embodiment illustrates one way in which changes to the synchronization endpoint may be associated with specific change IDs. Knowledge 404 may be a knowledge vector and may represent changes of which synchronization endpoint A 400 is aware. In one embodiment, versions or change IDs may be maintained for items or objects in a database and the versions may be used to identify what needs to be synchronized. Alternatively, a log of changes may also be maintained.

Figure 5:
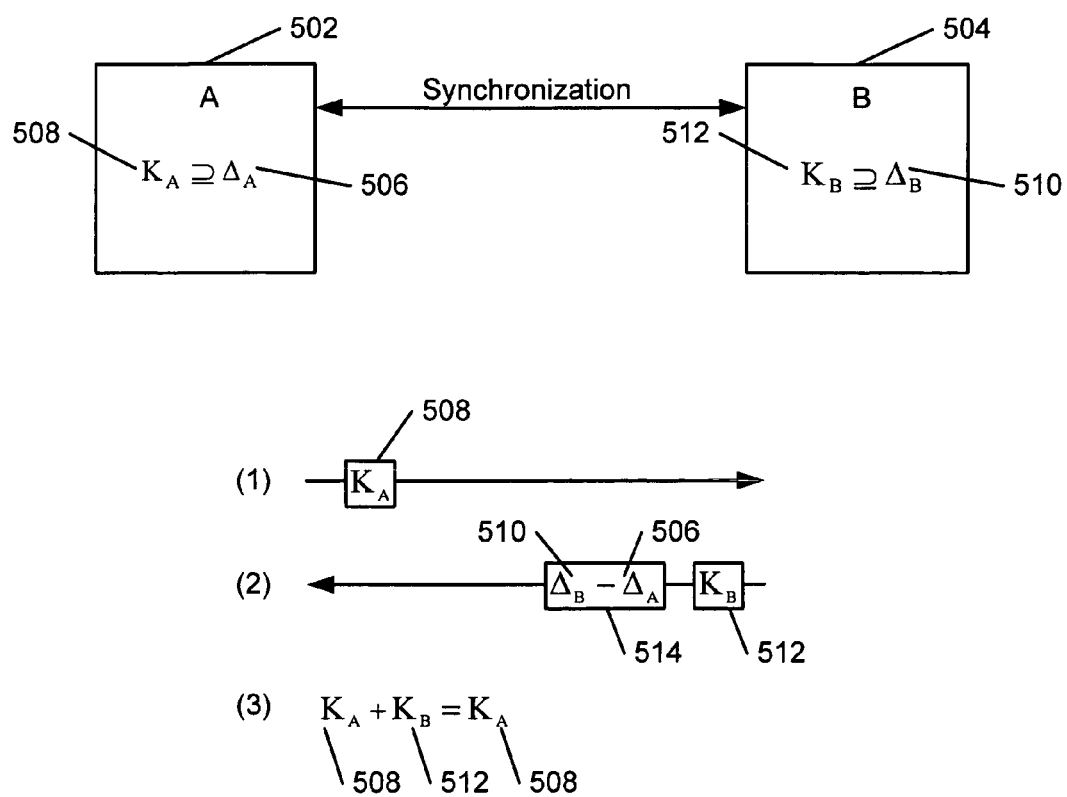
FIG. 5 is an exemplary timewise illustration of using knowledge to enumerate changes during synchronization in an embodiment consistent with the subject matter of this disclosure.

FIG. 5 illustrates use of knowledge to enumerate changes during synchronization. FIG. 5 shows two synchronization endpoints, namely a synchronization endpoint A 502 and a synchronization endpoint B 504. Synchronization endpoint A 502 may include a set of changes 506, in this example labeled $\Delta_A$. Synchronization endpoint A 502 may further include knowledge 508, in this example labeled $K_A$. Knowledge 508 may include a list of change IDs such as those described above. Similarly, synchronization endpoint B 504 may include a set of changes 510, each of which may be associated with a version that is a change ID. To begin the synchronization, at time (1) synchronization endpoint A 502 may send a synch request, which may include knowledge 508, to synchronization endpoint B 504. Synchronization endpoint B 504, by comparing knowledge 508 to the versions associated with each change in a set of changes 510, may make decisions regarding which of synchronization endpoint B's changes 510 synchronization endpoint A 502 already has in its changes 506 and changes about which synchronization endpoint A 502 is aware. Alternatively, synchronization endpoint B 504 may compare knowledge 508 to each item's version. Thus, synchronization endpoint B 504 may enumerate and send to synchronization endpoint A 502 at time (2) only that portion of synchronization endpoint B's changes 510 that are associated with versions that are not included in knowledge 508 of synchronization endpoint A 502, as illustrated by changes 514. For example, if the knowledge vector of synchronization endpoint A 502 was A3B12 and synchronization endpoint B 504 has current changes associated with versions that are change IDs B13 and B14, then the changes sent to synchronization endpoint A 502 would include those associated with the change IDs B13 and B14. In one embodiment, only B14 may be sent if B13 and B14 were made to the same item.

In addition, synchronization endpoint B 504 may also send synchronization endpoint B's knowledge 512 to synchronization endpoint A 502. Because synchronization endpoint B 504 has sent all of the changes 510 available in synchronization endpoint B 504 not already in synchronization endpoint A 502 to synchronization endpoint A 502, synchronization endpoint A 502 now has all of the changes 506 that were originally in synchronization endpoint A 502, insofar as those changes 510 have not been superseded by the changes sent by synchronization endpoint B 504, in addition to the changes 510 that were originally in synchronization endpoint B 504. Synchronization endpoint A 502 further has information about all of the changes of which synchronization endpoint B 504 was aware. Therefore, synchronization endpoint A 502 may update its knowledge 508 to reflect addition of the changes 510. This is done simply by adding synchronization endpoint A's knowledge 508 to synchronization endpoint B's knowledge 512 and defining that value as synchronization endpoint A's knowledge 508 such as is shown at time (3) in FIG. 5.

As such, an efficient synchronization may be performed wherein only the needed changes may be synchronized and wherein the individual synchronization endpoints only need to maintain information regarding the changes that reside within the particular synchronization endpoint and previous changes of which it is aware. While this example shows a complete synchronization of all of the changes on synchronization endpoint B 504 to synchronization endpoint A 502, cases may exist where only portions of the changes are synchronized. As such, only change IDs that correspond to changes that are synchronized may be added to the knowledge of the synchronization endpoint receiving updates.

Figure 6A:
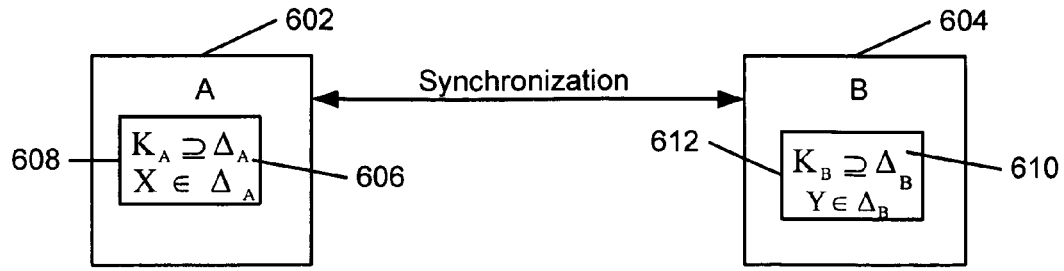
FIGS. 6A-6C illustrates an exemplary embodiment for detecting a synchronization data conflict.
Figure 6B:
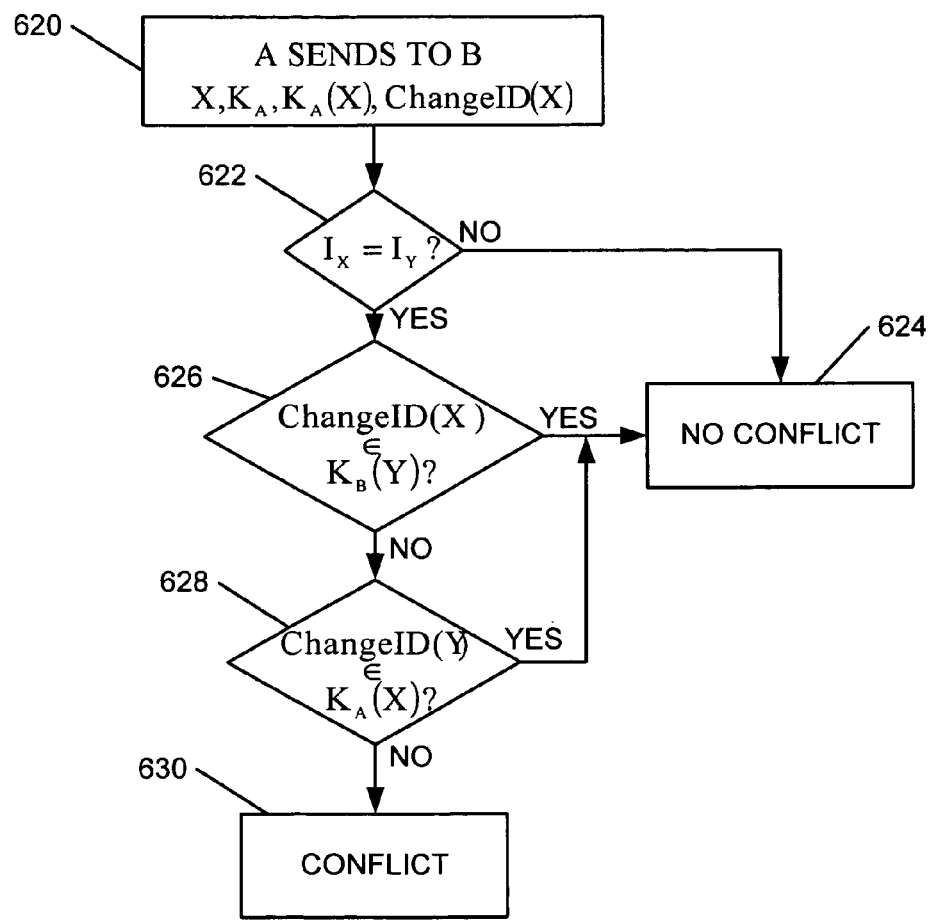

In addition to enumerating changes, knowledge of a synchronization endpoint may also be used in conflict detection. Referring now to FIGS. 6A and 6B, one embodiment of the present invention illustrates how conflict detection may be accomplished. FIG. 6A shows two synchronization endpoints connected by a communication link (wireless and or wired) for communication and synchronization. Synchronization endpoint A 602 may include knowledge 608 and a set of changes 606. As with the example in FIG. 5, knowledge 608 may include a collection of change IDs associated with changes 606 and associated with previous changes. Synchronization endpoint A 602 further may include, for purposes of this example, a change to an item made in synchronization endpoint A 602. The change is labeled X in FIG. 6A and X is a member of the changes 606. Similarly, synchronization endpoint B 604 may include knowledge 612, a collection of changes 610 and a change to an item labeled Y that is a member of the changes 610.

Illustratively, at act 620 of FIG. 6B, synchronization endpoint A 602 may send change X, labeled X, to synchronization endpoint B 604. Associated and sent with change X may be two other values, namely the change ID associated with change X, labeled ChangeID(X), and a made-with-knowledge value, labeled $K_A(X)$, which is knowledge that existed in synchronization endpoint A 602 at a time when change X was made to synchronization endpoint A 602 (act 620). Alternatively, in some embodiments consistent with the subject matter of this disclosure the made-with-knowledge may be knowledge that existed in a synchronization endpoint when a change is sent. Synchronization endpoint A's 602 current knowledge 608 may also be sent to synchronization endpoint B 604. Synchronization endpoint B 604 may then compare the item changed by change X, $I_X$, with the item changed by change Y, $I_Y$ (act 622). If change X and change Y correspond to different items, then there is no conflict (act 624).

If the changes refer to different versions of the same item, then further analysis may determine an occurrence of a conflict. Synchronization endpoint B 604 may then check to see if change X was known to synchronization endpoint B 604 when change Y was made in synchronization endpoint B 604 (act 626). Change Y may have a change ID, ChangeID(Y) and a made-with-knowledge value, $K_B(Y)$, associated with it. If ChangeID(X) is a member of change Y's made-with-knowledge, $K_B(Y)$, then there is no conflict. In other words, change Y was made in synchronization endpoint B 604 with knowledge of the change X made in synchronization endpoint A 602. As such, the change Y now represents the most current and valid data for synchronization endpoints A 602 and B 604. Although not shown in the example illustrated by FIG. 6B, at a subsequent time, change Y will likely be sent to synchronization endpoint A 602 and the item associated with changes X and Y updated to change Y on synchronization endpoint A 602 in a fashion described in FIG. 5.

If the changes X and Y are for the same item, and ChangeID(X) does not appear in $K_B(Y)$, then a check is done to see if change Y was known by synchronization endpoint A 602 when change X was made (act 628). This is typically done by checking to see if a change enumeration for change Y, illustrated as ChangeID(Y), is included in synchronization endpoint A's knowledge 608 at the time change X was made, $K_A(X)$. If ChangeID(Y) is a member of $K_A(X)$, then change X was made-with-knowledge of change Y and there is no conflict (act 624). Otherwise, a conflict is determined to exist (act 630). In this example, change X is the most current and valid change for the particular item. As such, synchronization endpoint B 604 will likely be updated with change X in a fashion as described in FIG. 5.

If the changes X and Y are for the same item, the ChangeID(Y) does not appear in $K_A(X)$ and ChangeID(X) does not appear in $K_B(Y)$, then a true conflict exists. In other words, change X and change Y were made independent of each other. In this case, a conflict will be detected and various conflict resolution rules may be applied to determine which change, X or Y, is the most current and valid change. Such rules may include checking time stamps to determine which change was made most recently, always resolving conflicts in favor of certain type of synchronization endpoints (such as those stored on servers) and or any other suitable conflict resolution. Alternatively, in one form of conflict resolution, an item with conflicting changes may be updated such that conflicting changes are merged to form a new change.

Figure 6C:
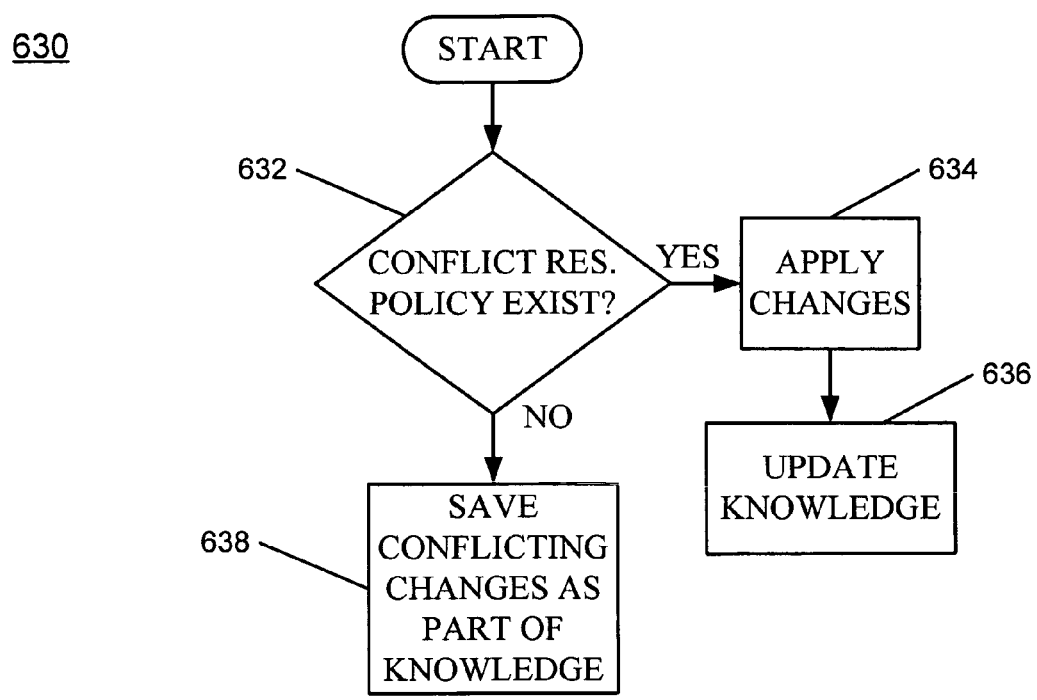

FIG. 6C is a flowchart that illustrates exemplary processing that may occur in a synchronization endpoint, such as, for example, synchronization endpoint B 604 when a conflict is detected during act 630 of FIG. 6B. After determining that a conflict exists, synchronization endpoint B 604 may determine whether a conflict resolution policy or rule exists for resolving the determined conflict (act 632). If a conflict resolution policy or rule is determined to exist, then synchronization endpoint B 604 may resolve the conflict, according to conflict resolution policy or rule, and it may apply the changes, as described with reference to FIG. 5.

If, at act 632, synchronization endpoint B 604 determines that no conflict resolution policy or rule exists for resolving the determined conflict, then synchronization endpoint B 604 may save conflicting changes X and Y as part of synchronization endpoint B's 604 knowledge (act 638). At a subsequent point in time, when synchronization endpoint B 604 synchronizes with another synchronization endpoint, synchronization endpoint B 604 may send its knowledge, including knowledge of the conflicting changes, to the other synchronization endpoint. The other synchronization endpoint may determine that a conflict exists and may resolve the conflict if the other synchronization endpoint has a conflict resolution policy or rules for resolving the conflict, or the other synchronization endpoint may save conflicting changes as part of its knowledge, as described with reference to FIG. 6C.

Figure 7:
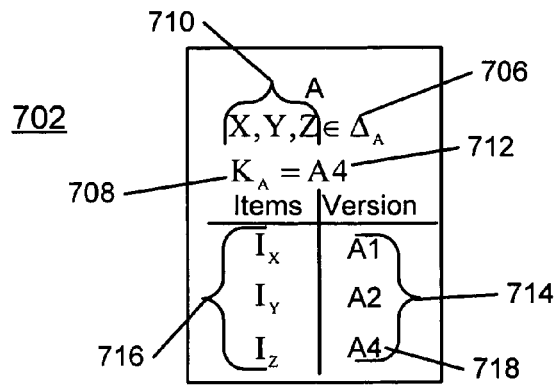
FIG. 7 illustrates an exemplary embodiment of change IDs and knowledge tracking during a synchronization operation.

Referring now to FIG. 7, one exemplary embodiment of Change IDs and knowledge tracking is shown. FIG. 7 shows a synchronization endpoint 702. Synchronization endpoint 702 may include a collection of changes 706 and knowledge 708. Collection of changes 706 may include several individual changes 710 in this example illustrated as X, Y and Z. In the example shown in FIG. 7, the present state of the knowledge of synchronization endpoint 702 is denoted by a knowledge vector 712, which in this case is A4. Knowledge vector 712 may represent all knowledge 708 of synchronization endpoint 702.

Also represented in FIG. 7 is a number of change IDs 714. In the example of FIG. 7, synchronization endpoint 702 may include three changed items 716, $I_X$, $I_Y$, and $I_Z$, corresponding to the changes 710. Using the change IDs, one can discern that the item $I_X$, with change ID A1, was made in synchronization endpoint 702 at a first time. Item $I_Y$, with change ID A2, was made in synchronization endpoint 702 at a time subsequent to change $I_X$. Item $I_Z$, with change ID A4, was made in synchronization endpoint 702 at a time subsequent to when the item $I_Y$ was changed. A3, though not illustrated directly in FIG. 7, may correspond to a previous change such as in one example, a change that is superseded by the change to item $I_Z$ labeled A4.

There is a difference between change ID A4 and knowledge vector 712, of synchronization endpoint 702, that is also labeled A4. In this example, the knowledge vector A4 signifies that knowledge 708 includes the changes corresponding to the change IDs labeled A4, A3, A2 and A1. Said differently, a knowledge vector may include the change represented by change ID 718 that is equal to the knowledge vector as well as all changes with the same synchronization endpoint ID that were made previous to change ID 718 represented in the knowledge vector. On the other hand, in the present example change ID 718, labeled A4, only represents the change Z made to item $I_Z$.

When a change is added to a particular synchronization endpoint, a change ID may be added as an exception to an exception list. The exception list may be merged into the knowledge vector when consecutive versions of changes from synchronization endpoints included in the exception list are accepted and there are no gaps in version numbers when combined with the knowledge vector of a synchronization endpoint. This is explained further with reference to FIG. 8.

Figure 8:
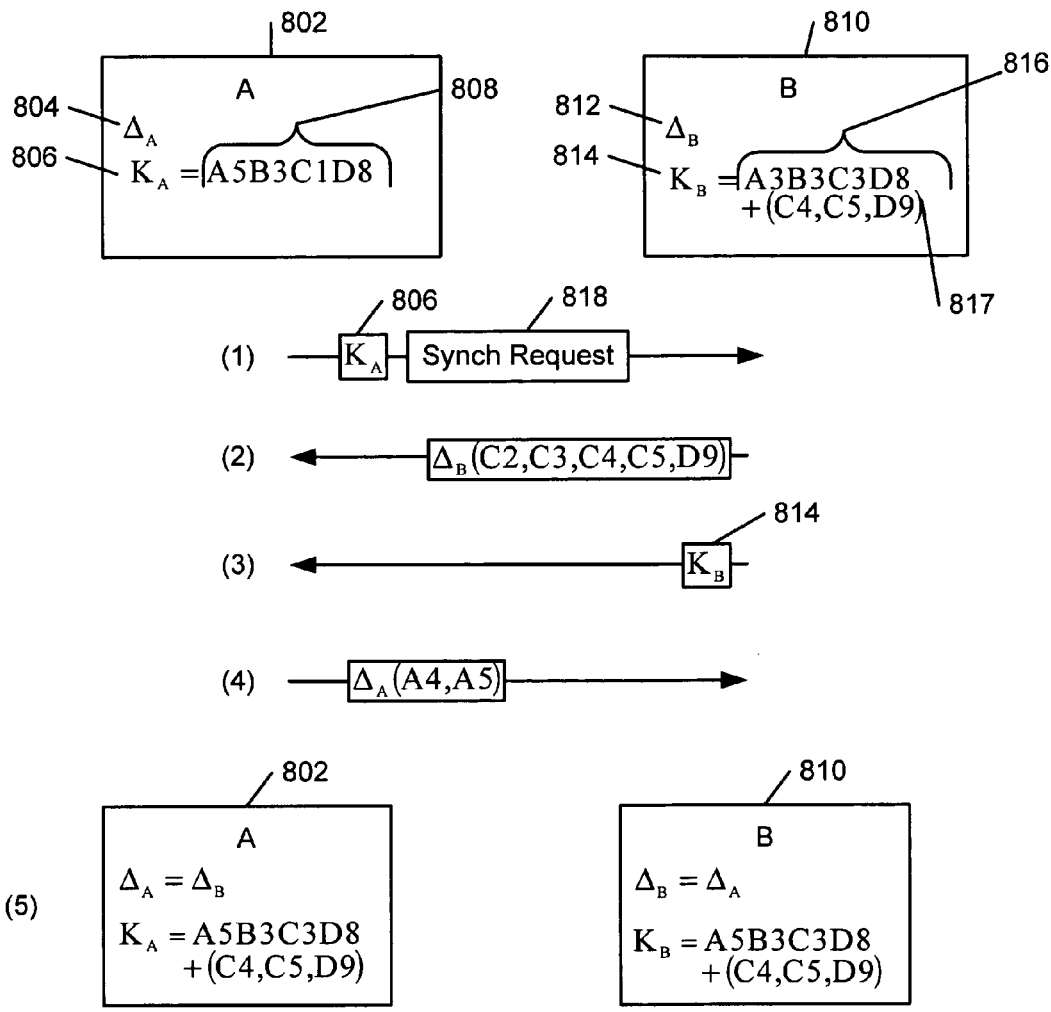
FIGS. 8, 10 and 12 illustrate synchronization using exception lists in exemplary embodiments consistent with the subject matter of this disclosure.

Referring now to FIG. 8, an example of two synchronization endpoints synchronizing in a topology containing a number of synchronization endpoints is shown. Synchronization endpoint A 802 contains a set of changes 804, knowledge 806 and a knowledge vector 808 that is a short hand representation of knowledge 806. Illustratively, knowledge vector 808 of synchronization endpoint A 802, A5B3C1D8, shows that synchronization endpoint A's knowledge 806 includes changes made up to a fifth change in synchronization endpoint A 802, knowledge up to a third change in a synchronization endpoint B 810, knowledge up to a first change in a synchronization endpoint C and knowledge up to an eighth change in a synchronization endpoint D. Synchronization endpoint B 810, in the example of FIG. 8, includes a set of changes 812, knowledge 814 including a knowledge vector 816, which is a shorthand representation of at least part of synchronization endpoint B's knowledge 814, and an exception list 817. Synchronization endpoint B's knowledge vector 816, A3B3C3D8, illustrates that synchronization endpoint B 802 has knowledge including knowledge up to a third change made by synchronization endpoint A 802, knowledge up to a third change made by synchronization endpoint B 810, knowledge up to a third change made by synchronization endpoint C and knowledge up to an eighth change made by synchronization endpoint D. The knowledge vectors set forth above may include a continuous representation of change enumerations made by a synchronization endpoint from a first change to some subsequent change. Exception list 817 includes a fourth change made by synchronization endpoint C, a fifth change made by synchronization endpoint C, and a ninth change made by synchronization endpoint D. In this example, the fourth change from synchronization endpoint C, C4, and the ninth change from synchronization endpoint D, D9, include conflicting changes to the same data item. That is, changes C4 and D9 are changes which have not been accepted and are the result of a delayed conflict resolution between synchronization endpoint C and synchronization endpoint D. Because changes C4 and D9 have not been accepted, they may not be merged into knowledge vector 816 of synchronization endpoint B 810. Further, because change C4 may not be merged into knowledge vector 816, later changes from synchronization endpoint C, such as, for example, C5, may also not be merged into knowledge vector 816.

A timewise illustration of the synchronization of synchronization endpoint A 802 with synchronization endpoint B 810 is illustrated in FIG. 8. At time (1), synchronization endpoint A 802 sends a synch request 818 along with synchronization endpoint A's knowledge 806, which may be represented by synchronization endpoint A's knowledge vector 808, to synchronization endpoint B 810. If synchronization endpoint A 802 included an exception list, which it does not in this example, then the exception list would be included with synchronization endpoint A's knowledge 806. Further, in some embodiments, synchronization endpoint A 802 may not send a separate sync request. In such embodiments, synchronization endpoint A 802 may send knowledge 806, which may also function as a sync request.

Synchronization endpoint B 810 at time (2) examines synchronization endpoint A's knowledge 806 by comparing it to change IDs associated with the changes in synchronization endpoint B. Synchronization endpoint B 810 may discover that synchronization endpoint A 802 is not aware of changes made by synchronization endpoint C that are labeled with the change IDs C2 and C3. Further, synchronization endpoint B 810 may discover that synchronization endpoint A 802 is not aware of changes C4, C5 and D9 from synchronization endpoint B's exception list 817. Thus, synchronization endpoint B 810 may send synchronization endpoint B's changes corresponding to these change IDs as long as the changes labeled with those change IDs are considered the current changes applicable to items in synchronization endpoint B 810. If a change ID corresponds to a previous outdated change, no change corresponding to that ID is sent. For example, if an item that had a version C3 was updated and assigned a new version, the change associated with C3 no longer exists in synchronization endpoint B 810 and is not sent to synchronization endpoint A 802. Subsequently or simultaneously, as illustrated in time (3), synchronization endpoint B 810 may send to synchronization endpoint A 802 synchronization endpoint B's knowledge 814, which may be represented as a knowledge vector 816 and exception list 817. The sending of knowledge 814 by synchronization endpoint B 810 at time (3) may be considered to be equivalent to sending a sync request in some embodiments.

At time (4) synchronization endpoint A 802 examines knowledge 814 sent by synchronization endpoint B 810 by comparing it to the change ID's corresponding to changes in synchronization endpoint A 802. Synchronization endpoint A 802 discovers that synchronization endpoint B 810 does not have either of the changes represented by the change IDs A4 and A5, or knowledge about those changes. Thus, synchronization endpoint A 802 sends any current changes existing in synchronization endpoint A's changes 804 or exception list (which does not exist in this example) corresponding to those change IDs (except when the change ID represents an outdated change such that no change is sent). Synchronization endpoint A 802 may subsequently send a message to synchronization endpoint B 810 indicating that all changes have been sent such that synchronization endpoint A 802 and synchronization endpoint B 810 can now update their knowledge vectors 808 and 816, respectively, to include the recent changes, if the changes have been accepted and are not changes associated with one or more unresolved conflicts. As shown in FIG. 8 at time (5), synchronization endpoint A's knowledge includes knowledge vector, A5B3C3D8, which is equal to synchronization endpoint B's knowledge vector and includes all changes made by synchronization endpoint A 802 up to a fifth change enumeration, all changes made by synchronization endpoint B up to a third change enumeration, all changes made by synchronization endpoint C up to a third change enumeration and all changes made by synchronization endpoint D up to an eighth change enumeration, as well as changes C4, C5 and D9, stored in an exception list. Note that, in this example, changes C4 and D9 include information with respect to a conflict between synchronization endpoint C and D.

Figure 9:
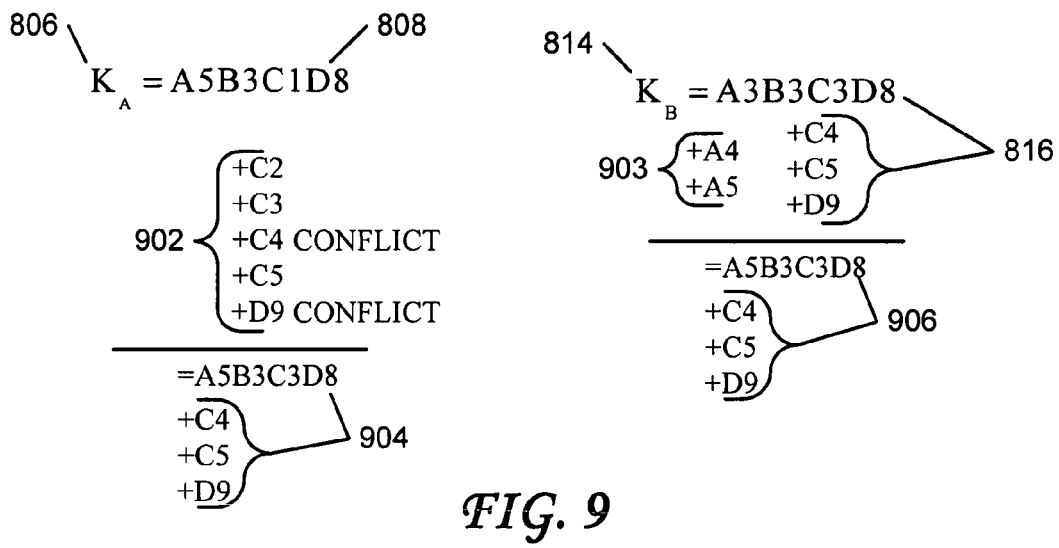
FIGS. 9, 11 and 13 illustrate exemplary methods of updating knowledge following a synchronization, such as that shown in FIGS. 8, 10 and 12, respectively.

FIG. 9 illustrates a method of updating knowledge following a synchronization such as that shown in FIG. 8. Specifically, FIG. 9 illustrates a method for updating knowledge vectors using an exception list 902 stored on synchronization endpoint A 802 and an exception list 903 stored in synchronization endpoint B 810. As changes are sent between synchronization endpoints, the changes are sent with a change ID associated with the change. When the change is added to a synchronization endpoint, the change ID may be added as an exception to an exception list 902 or 903. Examining knowledge for synchronization endpoint A 802 in FIG. 9, the knowledge includes knowledge vector 808 and exception list 902, which includes exceptions C2, C3, C4, C5 and D9 received from synchronization endpoint B 810. In this example, changes C4 and D9 pertain to a change to the same data item and made-with-knowledge associated with change C4 and change D9 indicate that the respective changes were made without knowledge of a conflicting change to the same data item. Changes C2 and C3 of the exception list 902 do not have conflicting data, in this example, and they may be applied to the data of synchronization endpoint A 802. Thus, changes C2 and C3 may then be removed from exception list 902 and knowledge vector 808 may be updated to provide updated knowledge 904, which may include a knowledge vector indicating that synchronization endpoint A 802 has applied all changes from synchronization endpoint A 802, up to a fifth change, all changes from synchronization endpoint B, up to a third change, all changes from synchronization endpoint C, up to a third change and all changes from synchronization endpoint D, up to an eighth change. Updated knowledge 904 may also include an exception list having changes C4, C5 and D9. In this example, changes C4 and D9 are conflicting changes and C5 is a change from synchronization endpoint C, which may be applied.

With respect to synchronization endpoint B 810, changes A4 and A5 received from synchronization endpoint A 802 may be added to exception list 903. Changes C4, C5 and D9 may already be included in an exception list and are part of knowledge 816 known by synchronization endpoint B 810 before synchronizing with synchronization endpoint A 802. After synchronizing with synchronization endpoint A 802, updated knowledge 906 may include knowledge vector A5B3C3D8, indicating that up to a fifth change from synchronization endpoint A 802, up to a third change from synchronization endpoint B 810, up to a third change from synchronization endpoint C and up to an eighth change from synchronization endpoint D have been applied to the data of synchronization endpoint B 810. Knowledge 906 further may include an exception list having changes C4, C5 and D9. In this example, C4 and D9 are conflicting changes, which have not been applied, and C5 is a fifth change from synchronization endpoint C which may be applied to the data of synchronization endpoint B 810.

In the example illustrated in FIGS. 8 and 9, knowledge of a conflict from another synchronization endpoint may be propagated and synchronization endpoints A 802 and B 810 may maintain knowledge of the conflict and may further propagate that knowledge during subsequent synchronizations. A synchronization endpoint that receives knowledge of the conflict may resolve the conflict if the synchronization endpoint includes a resolution policy or rule.

Figure 10:
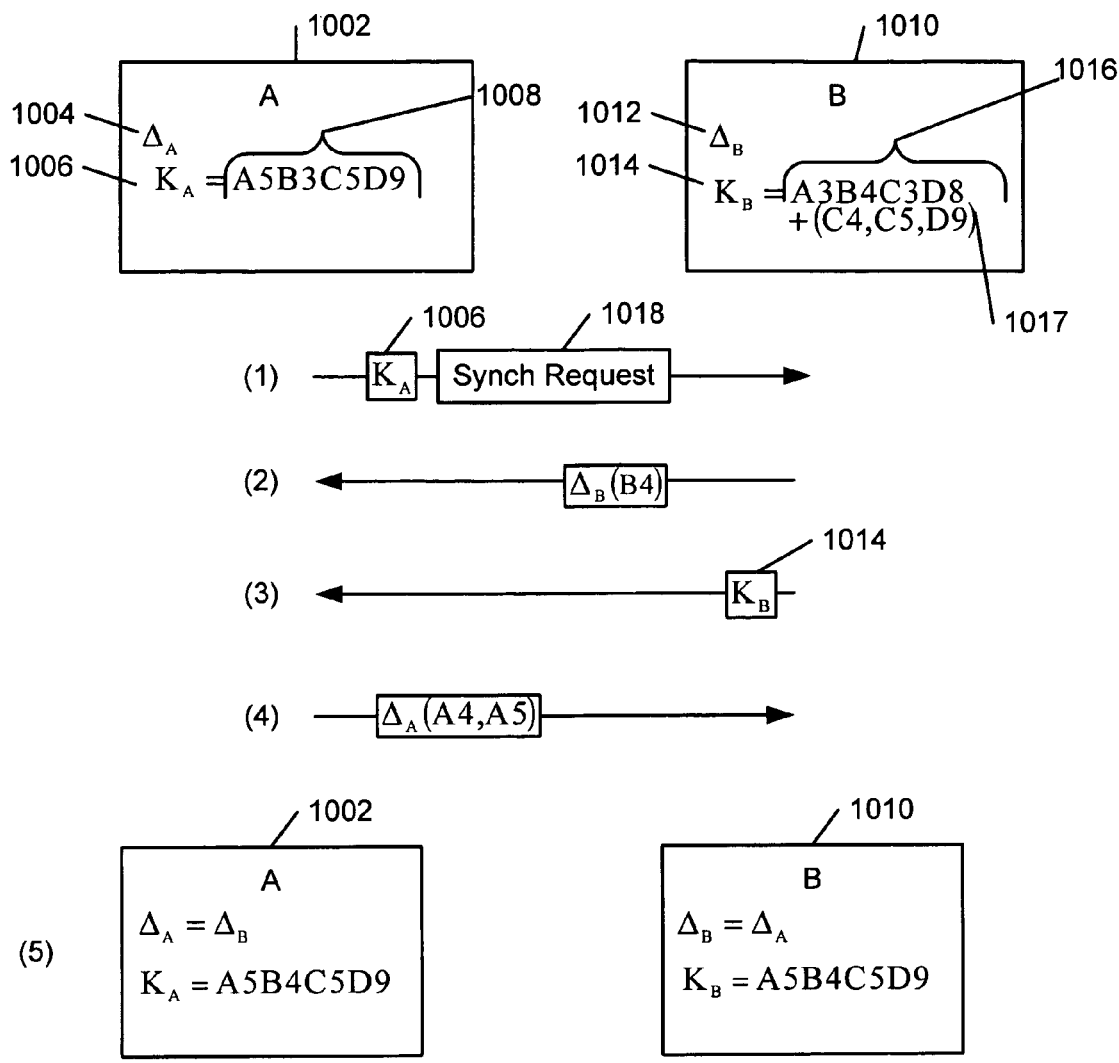

FIG. 10 illustrates another example of two synchronization endpoints synchronizing. Synchronization endpoint A 1002 contains a set of changes 1004, knowledge 1006 and a knowledge vector 1008 that is a shorthand representation of knowledge 1006. Knowledge vector 1008 of synchronization endpoint A 1002, A5B3C5D9, shows that synchronization endpoint A's knowledge 1006 includes changes made up to a fifth change in synchronization endpoint A 1002, knowledge up to a third change in a synchronization endpoint B 1010, knowledge up to a fifth change in a synchronization endpoint C and knowledge up to a ninth change in a synchronization endpoint D. Synchronization endpoint B 1010, in the example of FIG. 10, includes a set of changes 1012, knowledge 1014 including a knowledge vector 1016, which is a shorthand representation of at least part of synchronization endpoint B's knowledge 1014 and an exception list 1017. Synchronization endpoint B's knowledge vector 1016, A3B4C3D8, illustrates that synchronization endpoint B has knowledge including knowledge up to a third change made by synchronization endpoint A 1002, knowledge up to a fourth change made by synchronization endpoint B 1010, knowledge up to a third change made by synchronization endpoint C and a knowledge up to an eighth change made by synchronization endpoint D. Exception list 1017 includes a fourth change made by synchronization endpoint C, a fifth change made by synchronization endpoint C, and a ninth change made by synchronization endpoint D. In this example, the fourth change from synchronization endpoint C, C4, and the ninth change from synchronization endpoint D, D9, include conflicting changes to the same data item. That is, changes C4 and D9 are changes which have not been accepted and are the result of a delayed conflict resolution between synchronization endpoint C and synchronization endpoint D. because changes C4 and D9 have not been accepted, they may not be merged into knowledge vector 1016 of synchronization endpoint B 1010. Further, because change C4 may not be merged into knowledge vector 1016, later changes from synchronization endpoint C, such as, for example, C5, may also not be merged into knowledge vector 1016.

A timewise illustration of the synchronization of synchronization endpoint A 1002 with synchronization endpoint B 1010 is illustrated in FIG. 10. At time (1), synchronization endpoint A 1002 may send a sync request 1018 along with synchronization endpoint A's knowledge 1006, which may be represented by synchronization endpoint A's knowledge vector 1008, to synchronization endpoint B 1010. If synchronization endpoint A 802 included an exception list, which it does not this example, then the exception list would be included with synchronization endpoint A's knowledge 1006. As previously mentioned, in some embodiments, synchronization endpoint A 1002 may not send a separate sync request. In such embodiments, synchronization endpoint A 1002 may send knowledge 1006, which may also function as a sync request.

Synchronization endpoint B 1010, at time (2), may examine synchronization endpoint A's knowledge 1006 by comparing it to change IDs associated with the changes in synchronization endpoint B 1010. Synchronization endpoint B 1010 may discover that synchronization endpoint A 1002 is not aware of a change made by synchronization endpoint B that is labeled with the change ID B4. Thus, synchronization endpoint B 1010 sends synchronization endpoint B's change corresponding to change ID B4 as long as the change is considered a current change applicable to an item in synchronization endpoint B 1010. If a change ID corresponds to a previous outdated change, no change corresponding to ID is sent. Subsequently or simultaneously, as illustrated in time (3), synchronization endpoint B 1010 may send to synchronization endpoint A 1002 synchronization endpoint B's knowledge 1014, which may be represented as a knowledge vector 1016, and exception list 1017. The sending of knowledge 1014 by synchronization endpoint B 1010, a time (3), may be considered to be equivalent to sending a sync request in some embodiments.

At time (4) synchronization endpoint A 1002 may examine knowledge 1014 sent by synchronization endpoint B 1010 by comparing it to the change ID's corresponding to changes in synchronization endpoint A 802. Synchronization endpoint A 802 may discover that synchronization endpoint B 810 does not have either of the changes represented by the change IDs A4 and A5, or knowledge about those changes. Thus, synchronization endpoint A 1002 may send any current changes existing in synchronization endpoint A's changes 1004 or exception list (which does not exist in this example) corresponding to those change IDs (except when the change ID represents an outdated change such that no change is sent).

In this example, a change represented by change ID A5, changes a same data item as do changes represented by change IDs C4 and D9. Thus, when synchronization endpoint B 1010 receives information with respect to the change represented by change ID A5, synchronization endpoint B 1010 may determine that a potential conflict exists among the changes A5, C4 and D9. However, made-with-knowledge corresponding to change ID A5, in this example, indicates that the change represented by change ID A5 was made with knowledge of the changes represented by change IDs C4 and D9. Therefore, the change represented by change ID A5, in this example, is a resolution to the conflict represented by change IDs C4 and D9.

Synchronization endpoint A 1002 may subsequently send a message to synchronization endpoint B 1010 indicating that all changes have been sent such that synchronization endpoint A 1002 and synchronization endpoint B 1010 can now update their knowledge vectors 1008 and 1016, respectively, to include the recent changes, if the changes have been accepted and are not changes associated with one or more unresolved conflicts. As shown in FIG. 10 at time (5), synchronization endpoint A's knowledge includes knowledge vector, A5B4C5D9, which is equal to synchronization endpoint B's knowledge vector and includes all changes made by synchronization endpoint A 1002 up to a fifth change enumeration, all changes made by synchronization endpoint B up to a fourth change enumeration, all changes made by synchronization endpoint C up to a fifth change enumeration and all changes made by synchronization endpoint D up to a ninth change enumeration.

Figure 11:
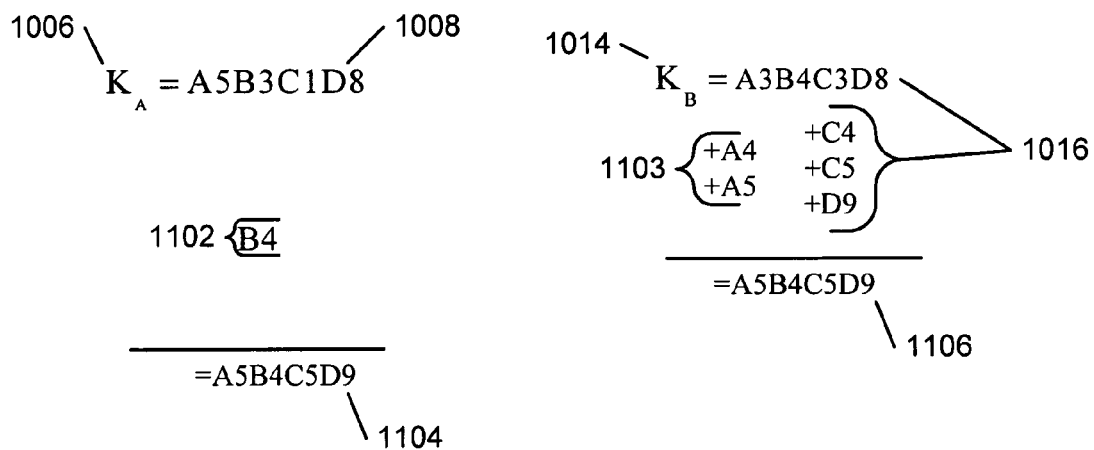

FIG. 11 illustrates a method of updating knowledge following a synchronization such as that shown in FIG. 10. Specifically, FIG. 11 illustrates a method for updating knowledge vectors using an exception list 1102 stored on synchronization endpoint A 1002 and an exception list 1103 stored on synchronization endpoint B 1010. As changes are sent between synchronization endpoints, the changes may be sent with a change ID associated with the change. When the change is added to a synchronization endpoint, the change ID may be added as an exception to an exception list 1102. Examining knowledge for synchronization endpoint A 1002 in FIG. 11, the knowledge includes knowledge vector 1008 and exception list 1102, which includes exception B4 received from synchronization endpoint B 810. Change B4 of exception list 1102 does not have conflicting data, in this example, and may be applied to the data of synchronization endpoint A 1002. Thus, change B4 may then be removed from exception list 1102 and knowledge vector 1008 may be updated to provide updated knowledge 1104, which may include a knowledge vector indicating that synchronization endpoint A 802 has applied all changes from synchronization endpoint A 802, up to a fifth change, all changes from synchronization endpoint B, up to a fourth change, all changes from synchronization endpoint C, up to a fifth change and all changes from synchronization endpoint D, up to a ninth change.

With respect to synchronization endpoint B 810, changes A4 and A5 received from synchronization endpoint A 1002 may be added to exception list 1103. Changes C4, C5 and D9 may already be included in an exception list and may be part of knowledge 1016 known by synchronization endpoint B 1010 before synchronizing with synchronization endpoint A 1002. After synchronizing with synchronization endpoint A 1002, updated knowledge 1106 may include knowledge vector A5B4C5D9, indicating that up to a fifth change from synchronization endpoint A 802, up to a fourth change from synchronization endpoint B 810, up to a fifth change from synchronization endpoint C and up to a ninth change from synchronization endpoint D have been applied to the data of synchronization endpoint B 810. Thus, in this example, a conflict represented by change IDs C4 and D9 may be resolved by receiving a change to a same data item, when the change was made with knowledge of the unresolved conflict.

Figure 12:
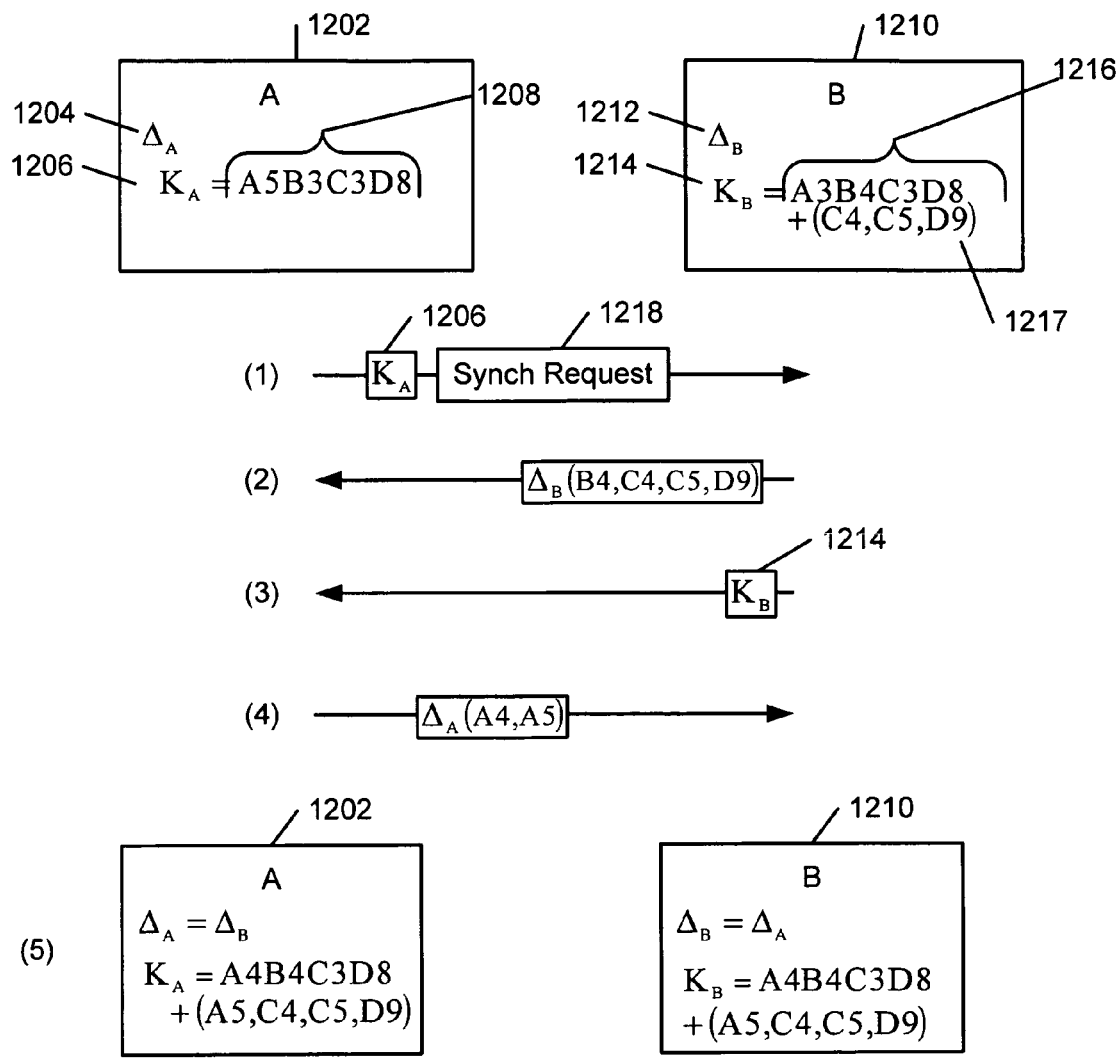

FIG. 12 illustrates yet another example of two synchronization endpoints synchronizing. Synchronization endpoint A 1202 contains a set of changes 1204, knowledge 1206 and a knowledge vector 1208, which is a shorthand representation of knowledge 1206. Knowledge vector 1208 of synchronization endpoint A 1202, A5B3C3D8, shows that synchronization endpoint A's knowledge 1206 includes changes made up to a fifth change in synchronization endpoint A 1202, knowledge up to a third change in a synchronization endpoint B 1010, knowledge up to a third change in a synchronization endpoint C and knowledge up to an eighth change in a synchronization endpoint D. Synchronization endpoint B 1210, in the example of FIG. 12, includes a set of changes 1212, knowledge 1214 including a knowledge vector 1216, which is a shorthand representation of at least part of synchronization endpoint B's knowledge 1214 and an exception list 1217. Synchronization endpoint B's knowledge vector 1216, A3B4C3D8, illustrates that synchronization endpoint B has knowledge including knowledge up to a third change made by synchronization endpoint A 1202, knowledge up to a fourth change made by synchronization endpoint B 1210, knowledge up to a third change made by synchronization endpoint C and a knowledge up to an eighth change made by synchronization endpoint D. Exception list 1217 includes a fourth change made by synchronization endpoint C, a fifth change made by synchronization endpoint C, and a ninth change made by synchronization endpoint D. In this example, the fourth change from synchronization endpoint C, C4, and the ninth change from synchronization endpoint D, D9, include conflicting changes to the same data item. That is, changes C4 and D9 are changes which have not been accepted and are the result of a delayed conflict resolution between synchronization endpoint C and synchronization endpoint D. Because changes C4 and D9 have not been accepted, they may not be merged into knowledge vector 1216 of synchronization endpoint B 1210. Further, because change C4 may not be merged into knowledge vector 1216, later changes from synchronization endpoint C, such as, for example, C5, may also not be merged into knowledge vector 1216.

A timewise illustration of the synchronization of synchronization endpoint A 1202 with synchronization endpoint B 1210 is illustrated in FIG. 12. At time (1), synchronization endpoint A 1202 may send a sync request 1218 along with synchronization endpoint A's knowledge 1206, which may be represented by synchronization endpoint A's knowledge vector 1208, to synchronization endpoint B 1210. If synchronization endpoint A 1202 included an exception list, which it does not this example, then the exception list would be included with synchronization endpoint A's knowledge 1206. As previously mentioned, in some embodiments, synchronization endpoint A 1202 may not send a separate sync request. In such embodiments, synchronization endpoint A 1202 may send knowledge 1206, which may also function as a sync request.

Synchronization endpoint B 1210, at time (2), may examine synchronization endpoint A's knowledge 1206 by comparing it to change IDs associated with the changes in synchronization endpoint B 1210. Synchronization endpoint B 1210 may discover that synchronization endpoint A 1202 is not aware of changes made by synchronization endpoint B that are labeled with the change IDs B4, C4, C5, and D9. Thus, synchronization endpoint B 1210 may send synchronization endpoint B's changes corresponding to change IDs B4, C4, C5, and D9 as long as the changes are considered current. If a change ID corresponds to a previous outdated change, no change corresponding to the change ID is sent. Subsequently or simultaneously, as illustrated in time (3), synchronization endpoint B 1210 may send to synchronization endpoint A 1202 synchronization endpoint B's knowledge 1214, which may be represented as a knowledge vector 1216, and exception list 1217. The sending of knowledge 1214 by synchronization endpoint B 1010, a time (3), may be considered to be equivalent to sending a sync request in some embodiments.

At time (4) synchronization endpoint A 1202 may examine knowledge 1214 sent by synchronization endpoint B 1010 by comparing it to the change ID's corresponding to changes in synchronization endpoint A 1202. Synchronization endpoint A 1202 may discover that synchronization endpoint B 1210 does not have knowledge of either of the changes represented by the change IDs A4 and A5. Thus, synchronization endpoint A 1202 may send any current changes existing in synchronization endpoint A's changes 1204 or exception list (which does not exist in this example) corresponding to those change IDs (except when the change ID represents an outdated change such that no change is sent).

In this example, a change represented by change ID A5, changes a same data item as do changes represented by change IDs C4 and D9. Thus, when synchronization endpoint B 1210 receives information with respect to the change represented by change ID A5, synchronization endpoint B 1010 may determine that a potential conflict exists among the changes A5, C4 and D9. In this example, made-with-knowledge corresponding to change ID A5 indicates that the change represented by change ID A5 was made without knowledge of the changes represented by C4 and D9. Further, made-with-knowledge corresponding to change IDs C4 and D9 indicate that the changes represented by change IDs C4 and D9 were made without knowledge of the change represented by change ID A5. Therefore, the change represented by change ID A5, in this example, is an additional conflict involving the same data item as changes represented by change IDs C4 and D9.

Synchronization endpoint A 1202 may subsequently send a message to synchronization endpoint B 1210 indicating that all changes have been sent such that synchronization endpoint A 1202 and synchronization endpoint B 1210 can now update their knowledge vectors 1208 and 1216, respectively, to include the recent changes, if the changes have been accepted and are not changes associated with one or more unresolved conflicts. As shown in FIG. 12 at time (5), synchronization endpoint A's knowledge includes knowledge vector, A4B4C3D8, which is equal to synchronization endpoint B's knowledge vector and includes all changes made by synchronization endpoint A 1202 up to a fourth change enumeration, all changes made by synchronization endpoint B up to a fourth change enumeration, all changes made by synchronization endpoint C up to a third change enumeration and all changes made by synchronization endpoint D up to an eighth change enumeration. Further, synchronization endpoint A 1202 and synchronization endpoint B 1210 include exception list (A5, C4, C5, D9) in their respective knowledge. In this example, A5, C4 and D9 represent unresolved conflicting changes to the same data item. Changes corresponding to change ID A4, which were previously accepted by synchronization endpoint A 1202, may be unaccepted, due to the determined conflict, and maybe added to the exception list included in synchronization endpoint A's knowledge 1406.

Figure 13:
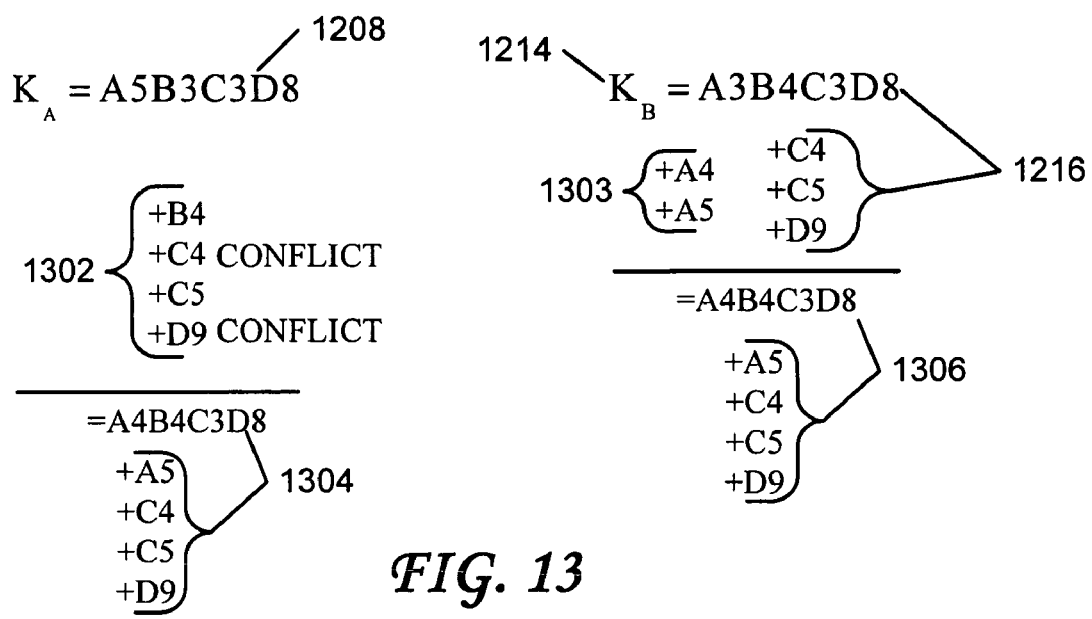

FIG. 13 illustrates a method of updating knowledge following a synchronization such as that shown in FIG. 12. Specifically, FIG. 13 illustrates a method for updating knowledge vectors using an exception list 1302 stored on synchronization endpoint A 1202 and an exception list 1303 stored on synchronization endpoint B 1210. As changes are sent between synchronization endpoints, the changes may be sent with a change ID associated with the change. When the change is added to a synchronization endpoint, such as synchronization endpoint A 1202, the change ID may be added as an exception to an exception list 1302. Examining knowledge for synchronization endpoint A 1202 in FIG. 13, the knowledge may include knowledge vector 1208 and exception list 1302, which may include exceptions B4, C4, C5, and D9 received from synchronization endpoint B 1210. The change represented by change ID B4 of exception list 1302 does not have conflicting changes, in this example, and may be applied to the data of synchronization endpoint A 1202. However, changes associated with change IDs C4 and D9 do have conflicting data and may not be applied to the data synchronization endpoint A 1202. Thus, change ID B4 may then be removed from exception list 1302 and knowledge vector 1208 may be updated to provide updated knowledge 1304, which may include a knowledge vector indicating that synchronization endpoint A 1202 has applied changes from synchronization endpoint A 1202, up to a fourth change, all changes from synchronization endpoint B, up to a fourth change, all changes from synchronization endpoint C, up to a third change and all changes from synchronization endpoint D, up to an eighth change. Knowledge 1304 may also include exceptions A5, C4, C5, and D9, in which changes represented by change IDs A5, C4 and D9 have conflicting changes to the same data item. In this example, because the change associated with change ID A5 is part of a conflict, the change may be unaccepted by synchronization endpoint A 1202 and the change ID, A5, representing the change may be added to an exception list included in knowledge 1304.

With respect to synchronization endpoint B 1210, changes A4 and A5 received from synchronization endpoint A 1202 may be added to exception list 1303. Changes C4, C5 and D9 may already be included in an exception list and maybe part of knowledge 1216 known by synchronization endpoint B 1210 before synchronizing with synchronization endpoint A 1202. After synchronizing with synchronization endpoint A 1202, updated knowledge 1306 may include knowledge vector A4B4C3D8, indicating that up to a fourth change from synchronization endpoint A 1202, up to a fourth change from synchronization endpoint B 1210, up to a third change from synchronization endpoint C and up to an eighth change from synchronization endpoint D have been applied to the data of synchronization endpoint B 1210. Updated knowledge 1306 may further include exceptions corresponding to the change IDs A5, C4, C5, and D9, in which changes represented by the change IDs A5, C4 and D9 are conflicting changes to the same data item. Thus, in this example, information indicating multiple conflicting changes to the same data item may be propagated to other synchronization endpoints.

CONCLUSION

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Although the above descriptions may contain specific details, they should not be construed as limiting the claims in any way. Other configurations of the described embodiments are part of the scope of this disclosure. Further, implementations consistent with the subject matter of this disclosure may have more or fewer acts than as described, or may implement acts in a different order than as shown. Accordingly, the appended claims and their legal equivalents should only define the invention, rather than any specific examples given.

We claim as our invention:

1. In a sync community that includes a plurality of synchronization endpoints, a method for propagation of conflict knowledge, the method comprising:
   receiving, at a first synchronization endpoint, knowledge information of a second synchronization endpoint, the knowledge information representing changes to data within the sync community of which the second synchronization endpoint is aware;
   comparing the knowledge information from the second synchronization endpoint with knowledge information of the first synchronization endpoint, the knowledge information of the first synchronization endpoint representing changes to data within the sync community of which the first synchronization endpoint is aware;
   enumerating, at the first synchronization endpoint, change information based on the comparing of the knowledge information from the second synchronization endpoint with the knowledge information of the first synchronization endpoint, the change information including data indicative of an unresolved synchronization data conflict between a third synchronization endpoint and another synchronization endpoint of the plurality of synchronization endpoints; and
   sending, from the first synchronization endpoint to the second synchronization endpoint, the change information.

2. The method of claim 1, further comprising:
   sending, from the first synchronization endpoint, the knowledge information of the first synchronization endpoint;
   receiving, at the first synchronization endpoint in response to the sending of the knowledge information of the first synchronization endpoint, enumerated change information from the second synchronization endpoint, the enumerated change information including data indicative of a second unresolved synchronization data conflict; and
   resolving the second unresolved synchronization data conflict by the first synchronization endpoint when the first synchronization endpoint includes knowledge of a change made to a data item associated with the second unresolved synchronization data conflict having associated made-with-knowledge including knowledge of conflicting changes of the second unresolved synchronization data conflict.

3. The method of claim 1, wherein the knowledge information from the second synchronization endpoint includes a knowledge vector.

4. The method of claim 1, further comprising:
   sending, from the first synchronization endpoint, the knowledge information of the first synchronization endpoint.

5. The method of claim 1, wherein the unresolved synchronization data conflict occurred during a synchronization of the first synchronization endpoint with a third synchronization endpoint.

6. The method of claim 1, wherein the unresolved synchronization data conflict occurred during a synchronization between a third synchronization endpoint and a fourth synchronization endpoint.

7. A computer-readable medium having instructions for at least one processor recorded thereon, the computer-readable medium comprising:
   instructions for sending a first synchronization request from a first synchronization endpoint to a second synchronization endpoint, the first synchronization request including knowledge information representing changes to data, within a sync community including a plurality of synchronization endpoints, of which the first synchronization endpoint is aware;
   instructions for receiving, at the first synchronization endpoint in response to sending the first synchronization request, change information from a second synchronization endpoint including knowledge information representing changes to data, within the sync community, of which the second synchronization endpoint is aware and of which the first synchronization endpoint is unaware;

instructions for determining an existence of a data synchronization conflict between the first synchronization endpoint and the second synchronization endpoint based, at least partially, on the received change information;

instructions for storing knowledge of the determined data synchronization conflict for propagation to a third synchronization endpoint within the sync community;

instructions for receiving, at the first synchronization endpoint, a second synchronization request from a synchronization endpoint of the plurality of synchronization endpoints; and instructions for sending, from the first synchronization endpoint to the synchronization endpoint of the plurality of synchronization endpoints, in response to receiving the second synchronization request, change information including data indicative of the data synchronization conflict between the first synchronization endpoint and the second synchronization endpoint, wherein the computer-readable medium is either a memory for a processing device or is included in a storage device for use with the processing device.

8. The computer-readable medium of claim 7, wherein the synchronization endpoint of the plurality of synchronization endpoints is a synchronization endpoint other than the second synchronization endpoint.

9. The computer-readable medium of claim 7, wherein the second synchronization request includes knowledge information representing changes to synchronization data of which the synchronization endpoint of the plurality of synchronization endpoints is aware within the sync community.

10. The computer-readable medium of claim 7, wherein the change information including data indicative of the data synchronization conflict between the first synchronization endpoint and the second synchronization endpoint comprises conflicting change information including at least two change IDs and corresponding change data.

11. The computer-readable medium of claim 7, wherein the knowledge information included in the first synchronization request includes a knowledge vector.

12. The computer-readable medium of claim 7, wherein:
the change information includes at least one change ID and corresponding change data,
the instructions for determining an existence of a data synchronization conflict between the first synchronization endpoint and a second synchronization endpoint further comprise:
instructions for determining that a data synchronization conflict exists between the first synchronization endpoint and the second synchronization endpoint when the change information from the second synchronization endpoint includes a first change to a data item, the first synchronization endpoint is aware of a second change to the data item, made-with-knowledge associated with the change to the data item and included in the change information from the second synchronization endpoint indicates that the second synchronization endpoint was not aware of the second change to the data item, and made-with-knowledge of the first synchronization endpoint and associated with the second change to the data item indicates that the first synchronization endpoint was not aware of the change to the data item.

13. The computer-readable medium of claim 7, wherein:
the change information includes at least one change ID and corresponding change data, and each of the at least one change ID includes a version and a synchronization endpoint ID that is associated with a particular synchronization endpoint in the sync community.

14. The computer-readable medium of claim 7, further comprising:
instructions for storing an exception list that includes information corresponding to the change information from the second synchronization endpoint.

15. The computer-readable medium of claim 7, further comprising:
instructions for updating the knowledge information of the first synchronization endpoint based on the received change information from the second synchronization endpoint.

16. A processing device for implementing a first synchronization endpoint within a sync community including a plurality of synchronization endpoints, the processing device comprising:
at least one processor;
a communication interface; and
a memory including instructions for the at least one processor, the at least one processor and the memory being connected via the communication interface, and the instructions for the at least one processor including:
instructions for maintaining knowledge information of the first synchronization endpoint representing changes to data within the sync community of which the first synchronization endpoint is aware,
instructions for comparing the knowledge information of the first synchronization endpoint with received knowledge information of a second synchronization endpoint,
instructions for determining existence of a synchronization data conflict based on the comparing of the knowledge information of the first synchronization endpoint with the received knowledge information of the second synchronization endpoint, and
instructions for storing knowledge of the determined synchronization data conflict for propagation to a third synchronization endpoint.

17. The processing device of claim 16, wherein the knowledge information of the first synchronization endpoint includes a first knowledge vector and the knowledge information of the second synchronization endpoint includes a second knowledge vector.

18. The processing device of claim 16, wherein the knowledge information of the first synchronization endpoint and the knowledge information of the second synchronization endpoint include data change information of the sync community of which the respective synchronization endpoints are aware, and made-with-knowledge information corresponding to each item of the synchronization data change information.

19. The processing device of claim 16, wherein:
the knowledge information of the first synchronization endpoint and the knowledge information of the second synchronization endpoint include data change information of the sync community of which the respective synchronization endpoints are aware, and made-with-knowledge information corresponding to each item of the synchronization data change information, and
the memory further includes:
instructions for determining that a data synchronization conflict exists between the first synchronization endpoint and the second synchronization endpoint when the synchronization data change information from the second synchronization endpoint includes a first change to a data item, the first synchronization endpoint is aware of a second change to the data item, the made-with-knowledge associated with the first change to the data item and included in the synchronization data change information from the second synchronization endpoint indicates that the second synchronization endpoint was not aware of the second change to the data item, and made-with-knowledge of the first synchronization endpoint and associated with the second change to the data item indicates that the first synchronization endpoint was not aware of the change to the data item.

20. The processing device of claim 16, wherein the memory further comprises:

instructions for enumerating change information based on comparing the knowledge information of the first synchronization endpoint with knowledge information of the third synchronization endpoint, the change information including information indicative of the synchronization data conflict.

* * * * *